United States Patent
Masis (10) Patent No.: US 11,340,871 B1
(45) Date of Patent: May 24, 2022

(54) SOFTWARE-DEVELOPMENT TOOL WITH FEEDBACK NOTIFICATIONS FOR IMPROVING SOFTWARE SPECIFICATIONS

(71) Applicant: Red Hat, Inc., Raleigh, NC (US)

(72) Inventor: Alexander Braverman Masis, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/141,282

(22) Filed: Jan. 5, 2021

(51) Int. Cl.
*G06F 8/10* (2018.01)
*G06F 8/33* (2018.01)

(52) U.S. Cl.
CPC . *G06F 8/10* (2013.01); *G06F 8/33* (2013.01)

(58) Field of Classification Search
None
See application file for complete search history.

(56) References Cited

U.S. PATENT DOCUMENTS

| | | | |
|---|---|---|---|
| 9,678,856 B2 | 6/2017 | Totale et al. | |
| 10,515,001 B2 | 12/2019 | Ayyappan et al. | |
| 10,810,110 B1 | 10/2020 | Thomas | |
| 2006/0265690 A1* | 11/2006 | Motoyama | G06F 11/3664 717/117 |
| 2007/0061774 A1* | 3/2007 | Chan | G06Q 10/06 717/101 |
| 2009/0100401 A1* | 4/2009 | Skriletz | G06F 8/20 717/100 |
| 2018/0349109 A1* | 12/2018 | Brown | G06F 8/41 |

OTHER PUBLICATIONS

Alshazy et al., "Detecting defects in software requirements specification," Elsevier, 2014, 15pg. (Year: 2014).*
Walia et al., "A systematic literature review to identify and classify software requirement errors," Elsevier, 2009, 23pg. (Year: 2009).*
Diepenbeck, M., et al., "Behaviour Driven Development for Tests and Verification," Institute of Computer Science, University of Bremen, 2014, https://link.springer.com/chapter/10.1007/978-3-319-09099-3_5.

(Continued)

*Primary Examiner* — Ryan D. Coyer
(74) *Attorney, Agent, or Firm* — Kilpatrick Townsend & Stockton, LLP (57) ABSTRACT

Software specifications can be improved using a software-development tool with feedback notifications. For example, a computing device can receive a textual input in a text box of a text editor from a user, the textual input defining a software specification that describes features of a software application for a software developer that is different from the user. The computing device can determine that a description of a software feature in the software specification excludes a particular descriptor characterizing the software feature. The computing device can, based on determining that the description excludes the particular descriptor, generate a graphical feedback notification indicating that the particular descriptor is absent from the description of the software feature. This feedback can assist the user in developing a more-complete software specification for use by the software developer in a software development process or a software testing process.

20 Claims, 4 Drawing Sheets

(56) References Cited

OTHER PUBLICATIONS

Holmes, J., "Behavior-Driven Development and Decision Management," Red Hat, Inc., 2018, https://www.redhat.com/cms/managed-files/rh-bdd-whitepaper-detail-f14267wg-201810-en.pdf.

Manuaba, I.B.K., "Combination of Test-Driven Development and Behavior-Driven Development for Improving Backend Testing Performance," Procedia Computer Science, 2019, https://www.sciencedirect.com/science/article/pii/S1877050919310622.

Stray, V., et al. (Eds.), "Agile Processes in Software Engineering and Extreme Programming," 21st International Conference on Agile Software Development, XP 2020, Copenhagen, Denmark, Jun. 18-12, 2020, Proceedings, https://link.springer.com/chapter/10.1007/978-3-030-49392-9_6.

* cited by examiner

SOFTWARE-DEVELOPMENT TOOL WITH FEEDBACK NOTIFICATIONS FOR IMPROVING SOFTWARE SPECIFICATIONS

TECHNICAL FIELD

The present disclosure relates generally to software development. More specifically, but not by way of limitation, this disclosure relates to a software-development tool with feedback notifications for improving software specifications.

BACKGROUND

Some software-development processes, such as behavior driven development (BDD), can involve a stakeholder providing a software specification to a software developer to use in developing or testing a software application. A software specification includes one or more documents in a human-readable format that describe functional details of the software application to the software developer. For example, the software specification can describe software requirements, such as features, events, inputs, and outputs for the software application in a textual form. Such software specifications are different from source code files written in a programming language, in that software specifications generally have a natural language format or another format that is designed for non-programmers to convey functional ideas at a conceptual level.

The software specification can include descriptors that describe software features to a software developer and communicate expectations as to how the software features are to function. For example, the descriptors can describe when aspects of the software feature are to occur, how aspects of the software feature are to be presented, and expected results of executing the software feature. The descriptors can allow a software developer or a software tester to comprehensively generate and test the software application.

DETAILED DESCRIPTION

Software-development processes can involve a stakeholder communicating expectations about how a software application is to function to a software developer or a software tester using a software specification. However, the stakeholder may not be aware of how much context or description to provide in the software specification. As a result, the software specification can be missing key information, leading to suboptimal development or testing of the software application. For example, the missing information can increase development time, reduce application functionality, and result in inadequate testing of the software application.

Additionally, stakeholders often draft software specifications using text editors, such as word processors or web-based text editors. These text editors are generally passive, in that they perform limited real-time analysis of textual inputs provided by the user, with most text editors being limited to performing basic spell checking and grammar checking. But, beyond these limited types of syntax analysis, text editors fail to provide meaningful feedback about the content input by the user.

Some examples of the present disclosure can overcome one or more of the abovementioned problems by providing a software-development tool configured to supplement a text editor by providing (e.g., in real time) feedback to a user about a software specification drafted by the user with the text editor. The software-development tool may be part of the text editor or separate from the text editor. As one example, a user can draft a software specification using a text editor. The text editor can be, for example, an executable application or a what-you-see-is-what-you-get (WYSIWYG) editor embedded in a webpage. The software specification can describe functional features of the software application for a software developer. As the user drafts the software specification in the text editor, the software-development tool can automatically search the software specification to determine if the software specification describes a particular functional feature. If the software-development tool determines that the software specification described a particular functional feature, the software-development tool can further search the description of the functional feature to determine if it is complete or missing relevant descriptors. Based on the search, the software-development tool can determine when the software specification is missing a particular descriptor and notify the user about the missing particular descriptor. This can yield a more comprehensive software specification that results in reduced software-development time and improved application functionality. Additionally, the feedback can lower the barrier for stakeholders with less technical experience to designing software applications.

As a more specific example, a user can draft a software specification on a user device using a text editor, such as word-processing software. The software specification can describe an autocomplete feature for search box in a software application to be developed by a software developer. The software specification for the search box can include descriptors of when the autocomplete feature is to be executed and how many autocomplete suggestions are to be generated. To aid the user in developing the software specification, the user may have downloaded and installed a software-development tool that is a plugin for the text editor. A plugin can be a software component that adds a specific feature or functionality to an existing computer program. As the user drafts the software specification in the text editor, the software-development tool plugin can automatically search the software description and determine that a descriptor for how to sort the autocomplete suggestions is missing, which may lead to confusion for the software developer or other suboptimal results. To avoid these problems, the software-development tool can generate and present a notification indicating that the descriptor is missing, so that the user can include the descriptor before the software specification is transmitted to the software developer. This real-time feedback may aid the user in generating a more comprehensive software specification.

In another example, the user can provide the software specification to the software-development tool after drafting some or all of the software specification using the text editor. For example, after completing a first draft of the software specification, the user may upload the software specification to a remote server that contains the software-development tool. The server can execute the software-development tool to analyze the software specification and provide feedback to the user, for assisting the user in drafting the software specification. Although in this example the feedback is not provided to the user in real time while the user is drafting the software specification (like the plugin example above), the feedback may still provide useful information to the user about the quality of the software specification prior to the user transmitting the software specification to the software developer.

In some examples, the software-development tool can serve as an intermediary between the user and the software developer. For example, the software-development tool can include an online web-portal through which the user and the software developer can communicate. In some such examples, the user can electronically transmit the software specification to the software developer through the software-development tool, after which the software developer may analyze the software specification to determine if it is sufficiently complete. If not, the software developer can interact with the software-development tool to notify the user that a software descriptor is missing, so that the user can update the software specification to include the software descriptor. Such feedback can be presented through the software-development tool to the user, which can further assist the user in producing a more comprehensive software specification that results in improved software development and testing.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
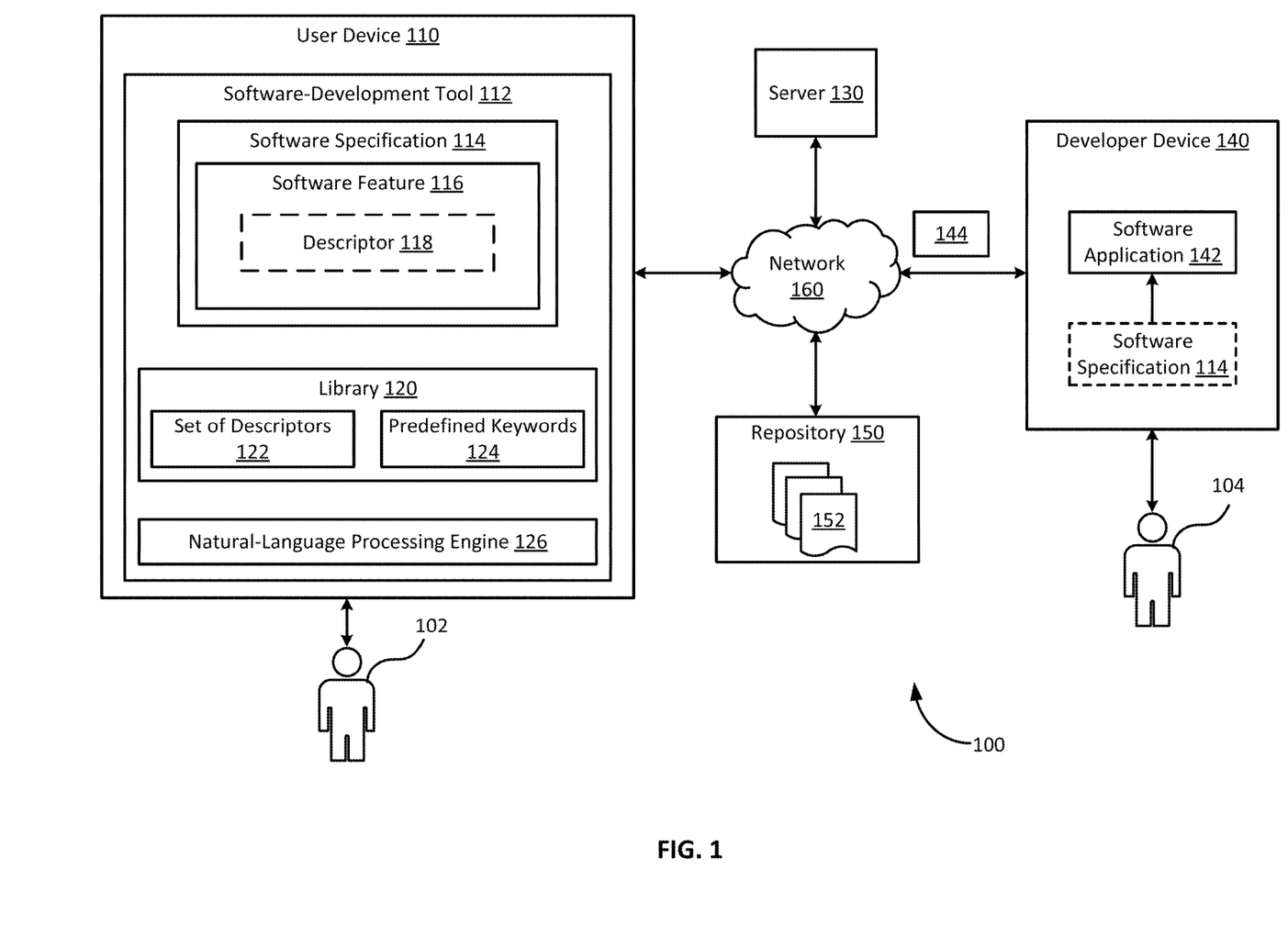
FIG. 1 is a block diagram of an example of a system for implementing a software-development tool with feedback notifications according to some aspects of the present disclosure.

FIG. 1 is a block diagram of an example of a system 100 for implementing a software-development tool 112 with feedback notifications according to some aspects of the present disclosure. The system 100 can include a user device 110. Examples of the user device 110 can include a laptop computer, desktop computer, server, mobile phone, etc. The system 100 can additionally include a server 130, a developer device 140, and a repository 150. Examples of the developer device 140 can include a laptop computer, desktop computer, server, mobile phone, etc. As shown in FIG. 1, some or all of these components can communicate with one another via a network 160, such as a local area network (LAN) or the Internet.

In some examples, the user device 110 can include the software-development tool 112. The software development tool 112 can be part of or separate from a text editor 106, which can be part of a website, a standalone application, a word processor, an integrated development environment (IDE), etc. A user 102 can interact with the user device 110 to draft a software specification 114 in the text editor 106. The software specification 114 can be in a human-readable format, such as a natural language format, designed for communicating details of a software application 142 to a software developer 104. The user 102 may or may not be an end user of the software application 142.

The software specification 114 can describe one or more software features, such as software feature 116, of the software application 142. Examples of the software feature 116 can include an autocomplete feature for a search field, a pop-up alert relating to an event, global positioning system (GPS) navigation features, graphical features (e.g., a launch icon), etc. The description of the software feature 116 can include descriptors that define parameters of the software feature 116. For example, if the software feature 116 is an autocomplete feature for a search field, the description of the autocomplete feature can describe the number of autocomplete suggestions to be generated, an order in which to present autocomplete suggestions, and when to present autocomplete suggestions.

In some examples, the software-development tool 112 can determine that the software feature 116 is described in the software specification 114. The software-development tool 112 can determine the software feature 116 is described in the software specification 114 by searching the software specification 114 for predefined keywords 124 associated with the software feature 116. The predefined keywords 124 can be stored in a library 120 on the user device 110. In some examples, the software-development tool 112 may execute a natural-language processing engine 126 on the software specification 114 to determine that the software feature 116 is described in the software specification 114.

After determining that a software feature 116 is described in the software specification 116, the software-development tool 112 can next determine whether that description of the software feature 116 is sufficiently complete. For example, the software-development tool 112 can analyze the description of the software feature 116 and determine that it excludes a descriptor 118, which may be important or desirable to include in the software specification 114. To determine that the description of the software feature 116 is missing the descriptor 118, the software-development tool 112 can search the description of the software feature 116 for a predefined set of descriptors 122 to be included in the description of the software feature 116. In some examples, the set of descriptors 122 can be included in the library 120. The software-development tool 112 can analyze the software specification 114 based on the library 120 to determine the descriptor 118 is absent from the description of the software feature 116. As one particular example, the set of descriptors 122 in the library 122 can correspond to an autocomplete search field and include a number of autocomplete suggestions to be generated, an order in which to present autocomplete suggestions, and when to present autocomplete suggestions. Additionally or alternatively, the software-development tool 112 can execute the natural-language processing engine 126 to search the description of the software feature 116 for the set of descriptors 122 and determine that the number of autocomplete suggestions to be generated is absent from description of the software feature 116. It will be appreciated that although the library 120 is depicted as separate from the software-development tool 112 in FIG. 1, in other examples they may be part of the text editor 112.

If the text editor 112 determines that a descriptor 118 is missing from the description of a software feature 116, the text editor 112 can generate a notification indicating that the descriptor 118 is absent from the description of the software feature 116. This feedback can help the user 102 create a more complete version of the software specification 114. The text editor 112 may also generate a recommendation indicating a candidate value for the descriptor 118 and include the recommendation in the notification. Such recommendations can assist the user 102 in resolving deficiencies in the software specification 114, particularly if the user 102 is less experienced and does not know how to resolve a deficiency offhand. In some examples, the text editor 112 can determine the candidate value based on historical values used for the descriptor 118 or predefined values for the descriptor 118. For example, the software feature 116 may have been part of one or more software specifications previously drafted by the user or other users. The descriptor values for the software feature 116 previously input by said users can be saved and reused later on as recommendations. For example, the text editor 112 can access the saved descriptor values and present a previous value for the descriptor 118 as the candidate value. As another example, predefined values for the descriptor 118 may be stored (e.g., in the library 120) and accessed by the text editor 112 to generate the candidate value.

In some cases, the user 102 may write many software specifications that have the same features. As a result, the user 102 may be manually re-writing the same content repeatedly, which is time consuming and tedious. So, the text editor 112 may provide templates 152 to improve drafting efficiency in some examples. In particular, the user 102 can access a repository 150 of templates 152 via the text editor 112. Each of the templates 152 can include a predefined description of a respective software feature that is capable of being included in the software application. The repository 150 can include templates 152 for one or more software features and/or one or more templates 152 for an individual software feature. For example, the repository 150 can include multiple templates 152 for a search box feature, and each template 152 can include a different predefined description of the search box. As one particular example, a first template in the repository 150 can include a predefined description for an autocomplete search box that presents five autocomplete suggestions as the user types in the search box. A second template in the repository 150 can include a predefined description for an autocomplete search box that presents ten autocomplete suggestions as the user types in the search box.

In some examples, each template in the repository 150 can be associated with a diagram, a mock, or an extended description of the resulting software feature from the predefined description of the respective template. The user 102 can select a template 152 for a desired software feature of the software application. The text editor 112 can receive the selection of the template 152 from the user 102 and responsively incorporate the predefined description specified in the selected template 152 into the software specification 114. For example, the text editor 112 can receive a selection of a template 152 with a predefined description for an autocomplete search box that presents five autocomplete suggestions as the user types in the search box. In response to receiving the selection, the text editor 112 can incorporate the description into the software specification 114.

In some examples, the template 152 may include one or more empty fields to be filled in by the user 102. For example, some of the descriptors for the software feature 116 can be missing from the template 152 or incomplete in the template 152. Once the template content is incorporated into the software specification 114, the text editor 112 can search the template content to determine that one or more descriptors are absent from the description of the software feature 116 and notify the user 102.

In some examples, the text editor 112 can electronically transmit the software specification 114 to the developer device 140 for use in creating or testing the software application 142. During the creation or testing of the software application 142, the developer 104 may provide feedback 144 to the user 102 about the software specification 114. The user device 110 can electronically receive the feedback 144 from the developer device 140 via the network 160. The feedback 144 can indicate that a software descriptor is missing from the software specification 114. Based on the feedback 144, the text editor 112 can generate an alert for the user 102 (e.g., in the text editor 112). The alert can indicate that the software specification 114 is to be updated to include the missing software descriptor.

While FIG. 1 shows a specific number and arrangement of components, other examples may involve more components, fewer components, different components, or a different arrangement of the components shown in FIG. 1. Additionally, while the above examples attribute certain functionality to the user device 110, other implementations are possible. For example, at least some of the components and functionality can be offloaded to a server 130. As one particular example, the text editor 112 can be part of a webpage generated by the server 130 and served to the user device 110 over the network 160. As the user 102 inputs text into a form on the webpage to define the software specification 114, the server 130 can analyze the text (e.g., in real time) and responsively provide notifications, recommendations, and alerts to the user 102 to assist the user 102 in drafting the software specification 114. In some such examples, the server 130 may include the library 120 and the natural-language processing engine 126 for analyzing the text input. The server 130 may also provide the user 102 with access to the templates 152 through the webpage. In some examples, the server 130 can further generate an online portal that serves as an intermediary between the user 102 and the software developer 104 to facilitate communications between the two.

Figure 2:
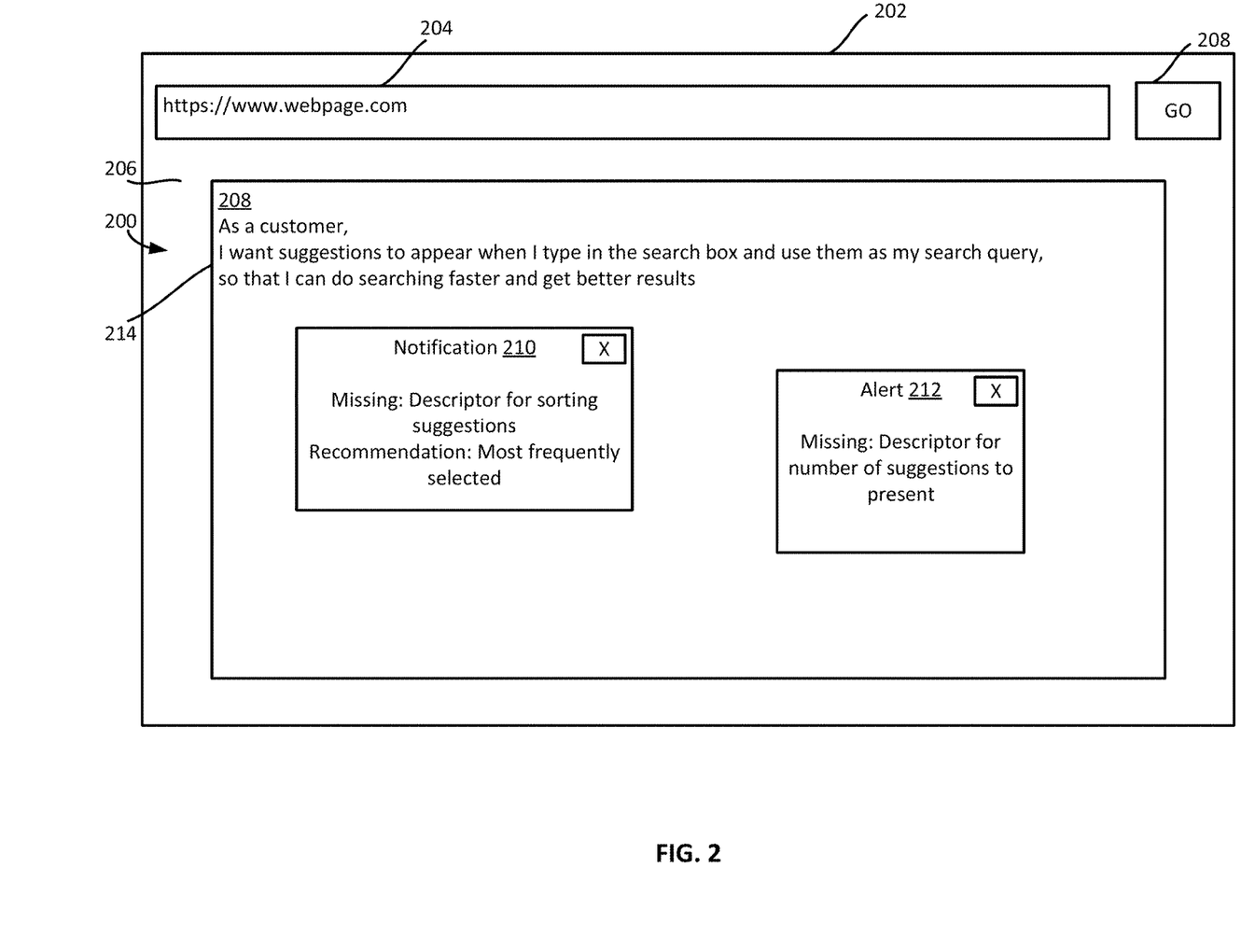
FIG. 2 is a diagram of a graphical user interface for a software-development tool with feedback notifications according to some aspects of the present disclosure.

FIG. 2 is a diagram of a website browser 202 including a webpage 206 with an embedded text editor 200 according to some aspects of the present disclosure. A user, such as a business owner, a project manager, or other stakeholder, can navigate to the webpage 206 via a website browser 202. For example, the user can input an address for the webpage 206 (e.g., a uniform resource locator (URL) for the webpage) into an address box 204 of the website browser 202 and select a "GO" button 208. The website browser 202 can obtain website code for the webpage 206 and render the webpage 206 using the website code.

In some examples, the text editor 200 can include a text box 214 where the user can input a software specification 208 for a software application. The user can input human-readable text describing software features for the software application. For example, the user can input a description for a search box feature in the software specification 208. As shown in FIG. 2, the description of the software feature can be "As a customer, I want suggestions to appear when I type in the search box and use them as my search query, so that I can do searching faster and get better results".

The text editor 200 can be configured to assist the user in drafting a more comprehensive version of the software specification 208 by automatically notifying the user about software descriptors that are absent from the software specification 208 and by automatically providing recommendations to the user of candidate values for the absent software-descriptors. For example, a system described herein can search (e.g., using a natural-language processing engine) the description of the software feature in the text box 214 to determine if predefined descriptors for the software feature are included in the description.

In some examples, the text editor 200 can determine that the software specification 208 excludes a descriptor characterizing the software feature. In response, the text editor 200 can generate a notification 210. The notification 210 can indicate the descriptor that is missing. The notification 210 can also include a recommendation of one or more candidate values for the descriptor. As shown in FIG. 2, the notification 210 indicates a descriptor for sorting autocomplete suggestions is missing and a candidate value of "most frequently selected" is recommended. This candidate value may mean that the autocomplete suggestions are to be sorted based on how frequently they are selected by users, for example with the more-frequent selections being near the top of the list and the less-frequent selections being near the bottom of the list.

In some examples, the text editor 200 can also present an alert 212 generated based on feedback from a software developer about a software descriptor that is missing from the software specification 208. The alert 212 can indicate the software specification 208 is to be updated to include the missing software descriptor. For example, the alert 212 can indicate a descriptor for a number of suggestions to present is missing from the software specification 208.

While FIG. 2 shows an example of a text editor 200 for illustrative purposes, other examples may involve more components, fewer components, different components, or a different arrangement of the components shown in FIG. 2. For example, although the notification 210 and the alert 212 are depicted as popup windows in FIG. 2, in other examples their content can be conveyed to the user using other approaches, such as through graphical indicators embedded in the webpage 206.

Figure 3:
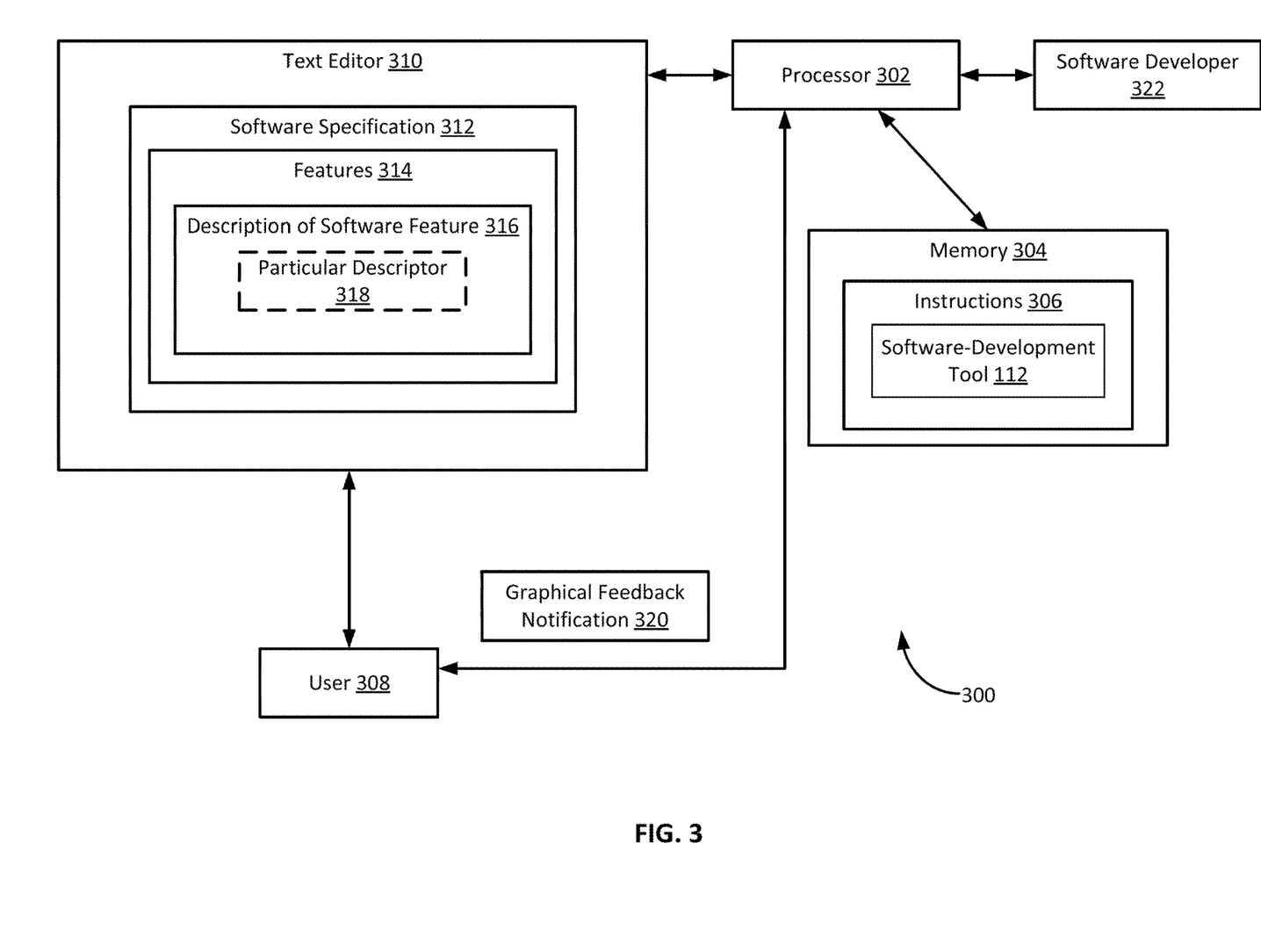
FIG. 3 is a block diagram of another example of a system for implementing a software-development tool with feedback notifications according to some aspects of the present disclosure.

FIG. 3 is a block diagram of another example of a system 300 for implementing a text editor with feedback notifications according to some aspects of the present disclosure. The system 300 includes a processor 302 communicatively coupled with a memory 304. In some examples, the processor 302 and the memory 304 can be part of the same computing device, such as the user device 110 of FIG. 1. In other examples, the processor 302 and the memory 304 can be distributed from (e.g., remote to) one another.

The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. In some examples, the instructions 306 can include processor-specific instructions generated by a compiler or an interpreter from code written in any suitable computer-programming language, such as C, C++, C#, etc.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. At least some of the memory 304 can include a non-transitory computer-readable medium from which the processor 302 can read instructions 306. A computer-readable medium can include electronic, optical, magnetic, or other storage devices capable of providing the processor 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

In some examples, the processor 302 can execute instructions 306 to perform various operations. For example, the processor 302 can receive a textual input 326 in a text box 324 of a text editor 310 from a user 308. The textual input 326 can define a software specification 312 that describes features 314 of a software application for a software developer 322. The software developer 322 is different from the user 308. The processor 302 can determine that a description of a software feature 316 in the software specification 312 excludes a particular descriptor 318 characterizing the software feature. For example, the processor 302 can determine that the software feature is described in the software specification 312 and then determine that the particular descriptor 318 is absent from the description of the software feature 316. Based on determining that the description excludes the particular descriptor 318, the processor can generate a graphical feedback notification 320 indicating that the particular descriptor 318 is absent from the description of the software feature 316. This can assist the user 308 in developing a more-complete software specification 312 for use by the software developer 322 in a software development process or a software testing process. In some examples, the processor 302 can further generate a recommendation for a candidate value for the particular descriptor 318. The processor 302 can include the recommended candidate value in the graphical feedback notification 320.

Figure 4:
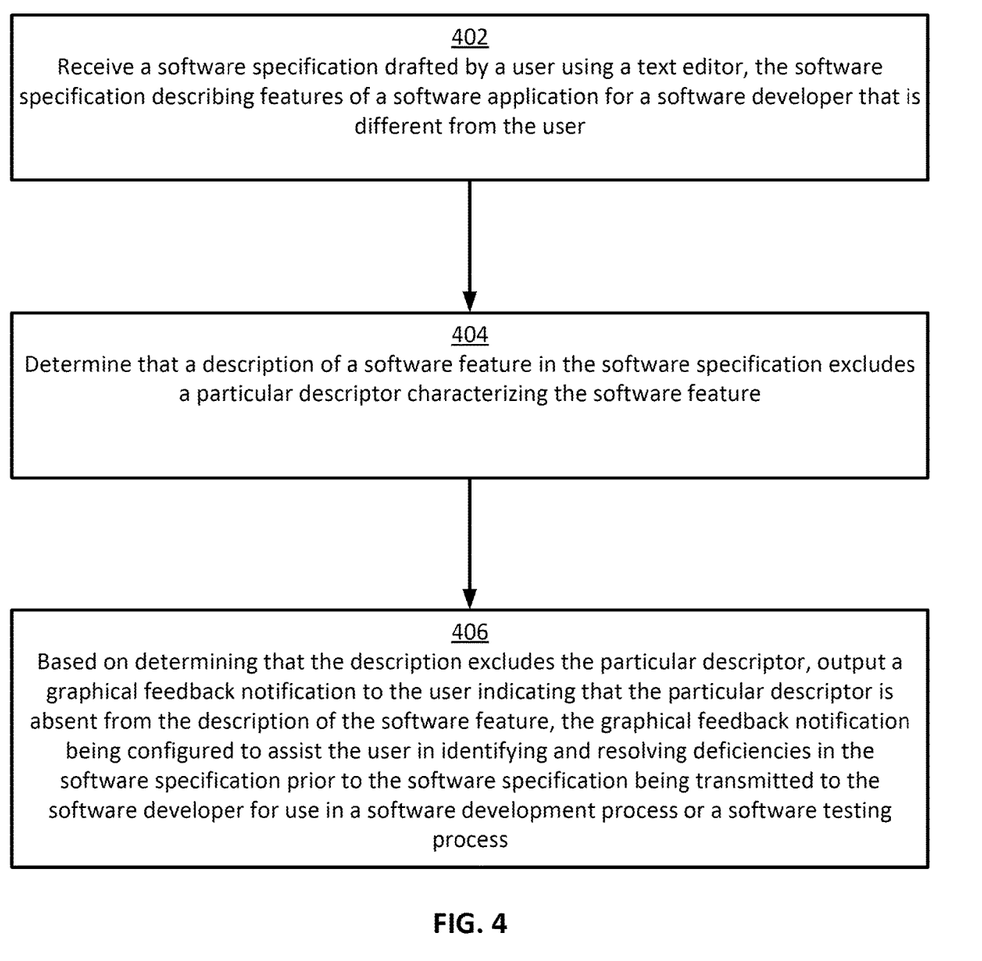
FIG. 4 is a flow chart of an example of a process for implementing a software-development tool with feedback notifications according to some aspects of the present disclosure.

In some examples, the processor 302 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIG. 3.

In block 402, a processor 302 receives a textual input 326 in a text box 324 of the text editor 310 from a user 308, the textual input 326 defining a software specification 312 that describes features 314 of a software application for a software developer 322 that is different from the user 308. In some examples, the text editor 310 may be part of a webpage. Alternatively, the text editor 310 can be part of a piece of executable software, such as a mobile-phone application or a standalone application. The software specification 312 can be in a human-readable format and may be created as part of a behavior driven development (BDD) process.

In block 404, the processor 302 determines that a description of a software feature 316 in the software specification 312 excludes a particular descriptor 318 characterizing the software feature. The determination can be made based on searching the description of the software feature 316 for one or more predefined keywords for the software feature and/or a predefined set of descriptors to be included in the description of the software feature 316. In some examples, the processor 302 can execute a natural-language processing engine to determine the description of the software feature 316 excludes the particular descriptor 318.

In block 406, based on determining that the description excludes the particular descriptor 318, the processor 302 generates a graphical feedback notification 320 indicating that the particular descriptor 318 is absent from the description of the software feature 316. In some examples, the graphical feedback notification 320 can include a recommendation indicating a candidate value for the particular descriptor 318 that may be selectable by the user 308 for incorporation into the software specification 312. Notifying the user 308 and providing the recommendation can assist the user 308 in generating of a more-complete software specification 312 that can be used by the software developer 322 in a software development process or a software testing process.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
a processor; and
a memory including instructions for a software-development tool, the instructions being executable by the processor for causing the processor to:
receive a software specification drafted by a user using a text editor, the software specification describing features of a software application for a software developer that is different from the user;
determine that a description of a software feature in the software specification excludes a particular descriptor characterizing the software feature; and
based on determining that the description excludes the particular descriptor, output a graphical feedback notification to the user indicating that the particular descriptor is absent from the description of the software feature, the graphical feedback notification being configured to assist the user in identifying and resolving deficiencies in the software specification prior to the software specification being transmitted to the software developer for use in a software development process or a software testing process.

2. The system of claim 1, wherein the memory further includes instructions that are executable by the processor for causing the processor to:
determine that the software feature is described in the software specification; and
based on determining that the software feature is described in the software specification, determine that the particular descriptor is absent from the description of the software feature by:
determining a predefined set of descriptors to be included in the description of the software feature; and
searching the description of the software feature for the predefined set of descriptors to determine that the particular descriptor is absent from the description.

3. The system of claim 2, wherein the memory further includes instructions that are executable by the processor for causing the processor to:
receive a library indicating the predefined set of descriptors to be included in the software specification; and
determine that the particular descriptor is absent from the description by analyzing the software specification based on the library.

4. The system of claim 2, wherein the memory further includes instructions that are executable by the processor for causing the processor to determine that the software feature is described in the software specification by:
searching the software specification for one or more predefined keywords associated with the software feature; and
identifying the one or more predefined keywords in the software specification.

5. The system of claim 2, wherein the software specification is in a natural language format, and wherein the memory further includes instructions that are executable by the processor for causing the processor to determine that the software feature is described in the software specification by executing a natural-language processing engine on the software specification.

6. The system of claim 1, wherein the memory further includes instructions that are executable by the processor for causing the processor to:
receive a selection of a template from the user, the template being selected by the user from among a plurality of templates, each template in the plurality of templates including a predefined description of a respective software feature that is capable of being included in the software application; and
in response to receiving the selection of the template, incorporate the predefined description specified in the selected template into the software specification.

7. The system of claim 1, wherein the memory further includes instructions that are executable by the processor for causing the processor to:
generate a recommendation indicating a candidate value for the particular descriptor; and
output the recommendation to the user through the text editor.

8. The system of claim 1, wherein the memory further includes instructions that are executable by the processor for causing the processor to electronically transmit the software specification to the software developer for use in creating or testing the software application.

9. The system of claim 1, wherein the text editor is part of a webpage.

10. The system of claim 1, wherein the memory further includes instructions that are executable by the processor for causing the processor to assist the user in drafting a more comprehensive version of the software specification by automatically notifying the user about software descriptors that are absent from the software specification in real time as the user drafts the software specification and by automatically providing recommendations to the user of candidate values for the absent software-descriptors.

11. The system of claim 1, wherein the memory further includes instructions that are executable by the processor for causing the processor to:
electronically receive feedback from the software developer indicating that a software descriptor is missing from the software specification; and
generate an alert for the user through the text editor, the alert indicating that the software specification is to be updated to include the missing software descriptor.

12. A method comprising:
receiving, by a processor and from a user, a textual input in a text box of a text editor, the textual input defining a software specification that describes features of a software application for a software developer that is different from the user;
determining, by the processor, that a description of a software feature in the software specification excludes a particular descriptor characterizing the software feature; and based on determining that the description excludes the particular descriptor, generating, by the processor, a graphical feedback notification indicating that the particular descriptor is absent from the description of the software feature to assist the user in developing a more-complete software specification for use by the software developer in a software development process or a software testing process.

13. The method of claim 12, further comprising:
determining that the software feature is described in the software specification; and
based on determining that the software feature is described in the software specification, determining that the particular descriptor is absent from the description of the software feature by:
  determining a predefined set of descriptors to be included in the description of the software feature; and
  searching the description of the software feature for the predefined set of descriptors to determine that the particular descriptor is absent from the description.

14. The method of claim 13, further comprising:
receiving a library indicating the predefined set of descriptors to be included in the software specification; and
determining that the particular descriptor is absent from the description by analyzing the software specification based on the library.

15. The method of claim 13, further comprising determining that the software feature is described in the software specification by:
  searching the software specification for one or more predefined keywords associated with the software feature; and
  identifying the one or more predefined keywords in the software specification.

16. The method of claim 12, further comprising:
receiving a selection of a template from the user, the template being selected by the user from among a plurality of templates, each template in the plurality of templates including a predefined description of a respective software feature that is capable of being included in the software application; and
in response to receiving the selection of the template, incorporating the predefined description specified in the selected template into the software specification.

17. The method of claim 12, further comprising:
generating a recommendation indicating a candidate value for the particular descriptor; and
outputting the recommendation to the user through the text editor.

18. The method of claim 12, further comprising:
electronically receiving feedback from the software developer indicating that a software descriptor is missing from the software specification; and
generating an alert for the user through the text editor, the alert indicating that the software specification is to be updated to include the missing software descriptor.

19. A non-transitory computer-readable medium comprising program code that is executable by a processor for causing the processor to:
  receive a textual input in a text box of a text editor from a user, the textual input defining a software specification that describes features of a software application for a software developer that is different from the user;
  determine that a description of a software feature in the software specification excludes a particular descriptor characterizing the software feature; and
  based on determining that the description excludes the particular descriptor, generate a graphical feedback notification indicating that the particular descriptor is absent from the description of the software feature to assist the user in developing a more-complete software specification for use by the software developer in a software development process or a software testing process.

20. The method of claim 12, wherein the graphical feedback notification is output to the user through the text editor.

* * * * *